US008606506B2

(12) United States Patent  
Johnson

(10) Patent No.: US 8,606,506 B2  
(45) Date of Patent: Dec. 10, 2013

(54) ROUTE-MATCHING METHOD FOR USE WITH VEHICLE NAVIGATION SYSTEMS

(75) Inventor: Richard A Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 2079 days.

(21) Appl. No.: 11/460,178

(22) Filed: Jul. 26, 2006

(65) Prior Publication Data

US 2008/0046174 A1 Feb. 21, 2008

(51) Int. Cl.
*G01C 21/32* (2006.01)

(52) U.S. Cl.
USPC ........... 701/410; 701/400; 701/408; 701/409; 701/411; 340/995.19; 340/995.21; 340/995.32; 340/988

(58) Field of Classification Search
USPC .................................. 701/209, 200, 207, 208
See application file for complete search history.

(56) References Cited

U.S. PATENT DOCUMENTS

| | | | | |
|---|---|---|---|---|
| 5,802,492 A * | 9/1998 | DeLorme et al. | ........... | 455/456.5 |
| 5,987,381 A * | 11/1999 | Oshizawa | ...................... | 701/209 |
| 6,421,607 B1 * | 7/2002 | Gee et al. | ...................... | 701/209 |
| 6,456,933 B1 * | 9/2002 | Hessing | ......................... | 701/209 |
| 6,553,308 B1 * | 4/2003 | Uhlmann et al. | ............. | 701/208 |
| 7,336,964 B2 * | 2/2008 | Casey | ......................... | 455/456.3 |
| 2003/0236818 A1 * | 12/2003 | Bruner et al. | ................. | 709/200 |
| 2005/0055155 A1 * | 3/2005 | Mafune | ......................... | 701/202 |
| 2005/0125149 A1 * | 6/2005 | Tada | .............................. | 701/210 |
| 2005/0149253 A1 * | 7/2005 | Nambata | ...................... | 701/201 |
| 2005/0171686 A1 * | 8/2005 | Davis | ............................. | 701/200 |
| 2006/0015249 A1 * | 1/2006 | Gieseke | ......................... | 701/210 |
| 2006/0069503 A1 * | 3/2006 | Suomela et al. | ............. | 701/211 |
| 2006/0116816 A1 * | 6/2006 | Chao et al. | .................... | 701/210 |
| 2006/0161343 A1 * | 7/2006 | Agnew et al. | ................. | 701/211 |

* cited by examiner

*Primary Examiner* — Khoi Tran  
*Assistant Examiner* — Jonathan L Sample  
(74) *Attorney, Agent, or Firm* — Anthony Luke Simon; Reising Ethington P.C.

(57) ABSTRACT

A method for matching navigational routes that are generated by separate route generators and are used by vehicle navigation systems. According to one embodiment, a user previews a first navigational route generated by a first route generator, such as those incorporated in a navigation-related website. From this first navigational route, a variety of location markers corresponding to different points along the route are generated. The location markers are then sent to a second route generator used by a vehicle navigation system, so that it can generate a second navigational route that is similar to the first route. The second navigational route is then sent to a navigation unit located on the vehicle, so that the driver can be given directions that generally correspond to the first navigational route which they initially reviewed on the navigation-related website.

10 Claims, 2 Drawing Sheets

ROUTE-MATCHING METHOD FOR USE WITH VEHICLE NAVIGATION SYSTEMS

TECHNICAL FIELD

The present invention generally relates to vehicle navigation systems and, more particularly, to methods of matching or synchronizing navigational routes generated by separate route generators.

BACKGROUND OF THE INVENTION

In recent years, vehicle navigation systems have grown in popularity and are now widely available in a variety of forms, including on-board or autonomous systems and off-board or telematics-based systems. In general, autonomous vehicle navigation systems include vehicle-installed units that utilize locally stored navigation information, such as that stored on a CD or DVD, to provide the user with navigation services such as turn-by-turn directions, etc. Telematics-based systems, on the other hand, utilize wireless voice and data technologies to communicate between vehicle-installed hardware and a system back-end like a call center that stores navigation information, such as updated maps, real-time traffic reports, construction information, etc. Telematics-based systems are thus able to provide the user with turn-by-turn directions and other navigation services using up-to-date information.

Each of these two types of vehicle navigation systems can typically provide a user with a detailed navigation route that guides them from a starting point to a selected destination, and can include additional features known to those skilled in the art. In some instances, a user may want to first plan their route using a navigation-related website, and then follow a route generated by their vehicle navigation system. In instances such as this, it can be helpful if the route generated by the website is similar to that generated by the vehicle navigation system so that discrepancies between the two routes are minimized and thereby reduce the possibility of driver confusion.

SUMMARY OF THE INVENTION

According to one aspect of the invention, there is provided a route-matching method for use with a vehicle navigation system. This particular method generally comprises the steps of: (a) utilizing a first route generator to generate a first navigational route having a plurality of location markers, (b) providing the plurality of location markers to a second route generator, (c) utilizing the second route generator and the plurality of location markers to generate a second navigational route, and (d) providing the second navigational route to a vehicle navigation unit.

According to another aspect, there is provided a method for synchronizing navigational routes. This particular method generally comprises the steps of: (a) receiving a plurality of location markers corresponding to a first navigational route, (b) utilizing the plurality of location markers to generate a second navigational route that is similar to the first navigational route, and (c) providing the second navigational route to a vehicle navigation unit.

According to yet another aspect, there is provided a system for coordinating navigational routes, comprising: a navigation-related website having a first route generator, a telematics-based vehicle navigation system having a call center with a second route generator and having a navigation unit located on the vehicle, and a communications network. The call center sends a second navigational route that is similar to a first navigational route to the navigation unit over the communications network.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The route-matching method disclosed herein enables a user to initially preview a navigational route generated by a first route generator, such as that available through a web-based user interface, and then receive corresponding turn-by-turn directions or other navigational services from a second route generator that is part of a vehicle navigation system. By ensuring that the two navigational routes are similar to one another, the present method reduces the likelihood of user confusion that can arise when first and second route generators provide alternative routes to the same destination. For example, traditional route generators usually operate independently of one another and oftentimes use different route generating algorithms and/or map data. Thus, if a user wants to preview a route first at a navigation-related website, that route could vary significantly from the actual route generated by their vehicle navigation system when they are driving; different navigational routes can confuse the user, as they may be expecting the first route previewed beforehand, only to get a second, different route once they are driving. The present route-matching method addresses this concern.

Figure 1:
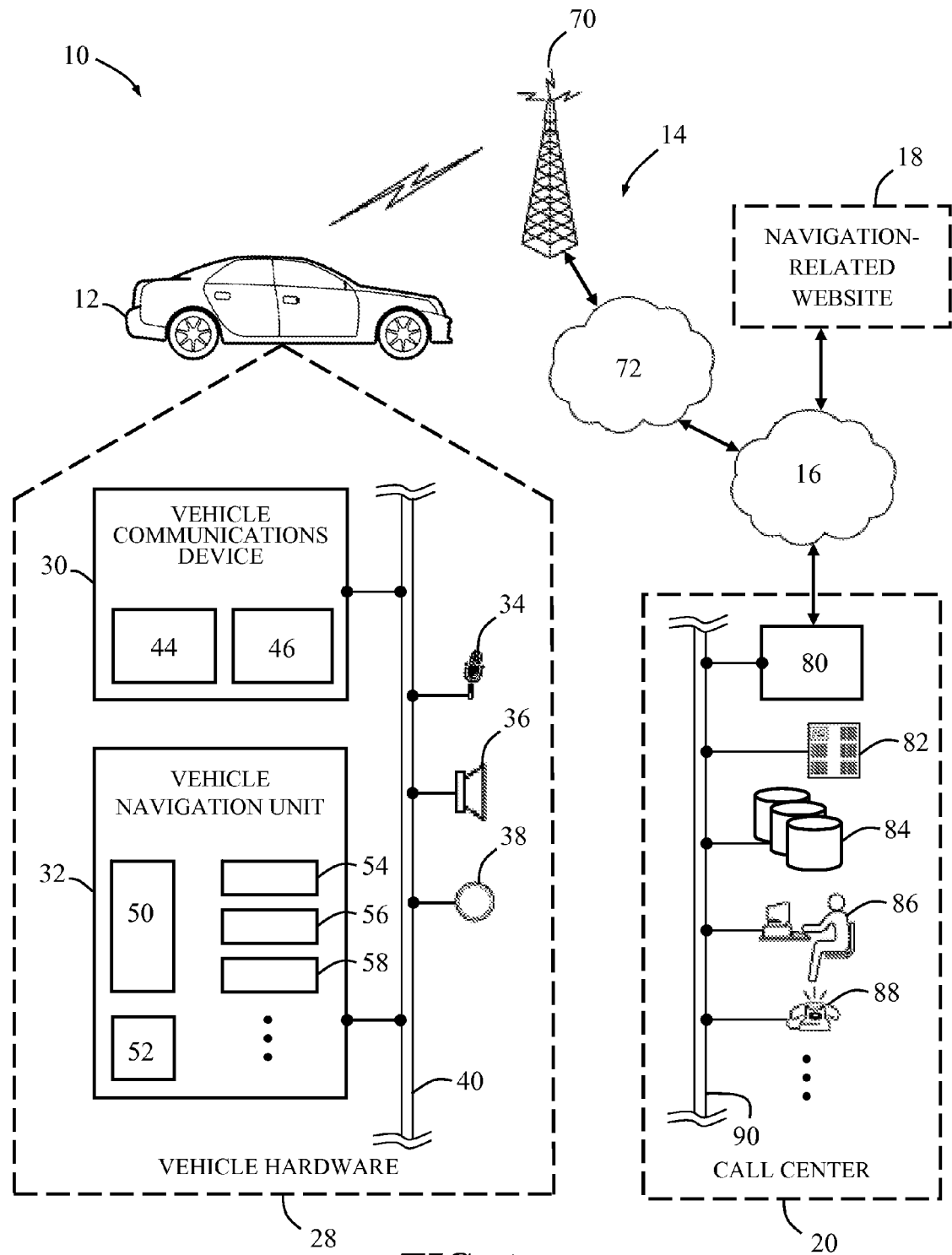
FIG. 1 is a block diagram of a system that is capable of utilizing the route-matching method.

Beginning with FIG. 1, there is shown an example of a system 10 that is capable of utilizing the route-matching method disclosed herein. System 10 generally includes a vehicle 12, a wireless carrier system 14, a communications network 16, a navigation-related website 18, and a call center 20. It should be understood that the route-matching method described below can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10, however, other systems not shown here could employ the disclosed method as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a vehicle communications device 30, a vehicle navigation unit 32, a microphone 34, a speaker 36, and buttons and/or controls 38 that are interconnected using a network connection or bus 40. Examples of suitable network connections include a controller area network (CAN), a media oriented system transfer (MOST), a local interconnection network (LIN), an ethernet, and other appropriate connections such as those that conform with known ISO, SAE, and IEEE standards and specifications, to name but a few.

Vehicle hardware 28 includes devices that provide vehicle occupants with a means of communicating with and through the various components of the vehicle hardware. Such devices may include microphone 34, speakers 36, buttons and/or controls 38, and a visual display, such as a heads-up display or LCD video screen. These devices allow a user to input commands, receive audio/visual feedback, and provide voice communications. Microphone 34 provides an occupant with a means for inputting verbal or other auditory commands, and can be equipped with an embedded voice processing unit utilizing human/machine interface (HMI) technology known in the art. Conversely, speaker 36 provides verbal output to a vehicle occupant and can be a dedicated, stand-alone speaker or part of the vehicle audio system. In either event, microphone 34 and speaker 36 enable vehicle hardware 28 and call center 20 to communicate with the occupants through audible speech. Buttons and/or controls 38 enable a vehicle occupant to activate or engage one or more of the vehicle hardware components 28. For instance, button 38 can be an electronic push-button used to initiate voice communication with call center 20.

Vehicle communications device 30 facilitates voice and data communication between vehicle 12 and other devices, systems, networks, etc., such as navigation-related website 18 or call center 20. Vehicle communications device 30 typically uses radio transmissions to establish a voice channel with wireless carrier system 14 so that both voice and data transmissions can be sent and received over the voice channel. By providing both voice and data communication, vehicle communication device 30 enables the vehicle to offer a number of different services including those related to navigation, telephony, emergency assistance, diagnostics, infotainment, etc. According to one embodiment, vehicle communications device 30 includes a standard cellular chipset 44 for voice communications and a modem 46 for data transmission. In order to enable successful data transmission over the voice channel, modem 46 applies some type of encoding or modulation to convert the digital data so that it can communicate through a vocoder or speech codec incorporated in chipset 44. Any suitable encoding or modulation technique that provides an acceptable data rate and bit error rate can be used with the disclosed method.

Vehicle navigation unit 32 can be part of either a telematics-based navigation system or an autonomous navigation system. Both systems typically interact with one or more interface devices like microphone 34, speaker 36, buttons and/or controls 38, and display screens, and unit 32 generally include an electronic processing device 50, one or more types of electronic memory 52, a position sensor 54 such as a GPS receiver; and a number of function-specific devices or modules 56-58. A telematics-based or off-board vehicle navigation system typically transfers wireless voice and data information between hardware located on the vehicle and a call center in order to provide various navigation-related services. In this sense, telematics-based systems generally operate according to a client/server arrangement where the vehicle-integrated hardware acts as the client and the call center acts as the server. When a user requests navigation related assistance through a telematics-based system, the request is wirelessly sent through wireless carrier system 14 to be processed at call center 20. Hardware and/or software at the call center acts as a route generator, creating a vehicle navigation route. The route is then wirelessly communicated back to vehicle hardware 28 so that it can be provided to the user in the form of turn-by-turn directions or some other format.

An autonomous vehicle navigation system uses locally stored road data along with GPS-derived position data in order to provide the user with navigation services. The road data is generally stored locally on a CD, DVD, or other electronically-readable storage medium. Unlike the telematics-based system, an autonomous navigation system does not require communication with a back-end system, such as call center 20. An autonomous system acts as its own server or route generator, generating the user's requested navigation route and then providing that route to the user through a user interface. Although an autonomous system does not rely on a back-end system, many are capable of wireless voice and/or data communication. For example, some autonomous systems can communicate over a vehicle network and through wireless carrier system 14 in order to receive updated software and data, such as software enhancements.

It should be noted that the telematics-based and autonomous vehicle navigation systems described above are simply two examples of vehicle navigation systems with which the route-matching method may be used. Accordingly, the route-matching method is not limited to these specific examples and could be used with one of numerous combinations of vehicle systems, including other embodiments of telematics-based and autonomous vehicle navigation systems, as well as other types of vehicle navigation systems not mentioned here.

Wireless carrier system 14 is preferably a cellular telephone system or any other suitable wireless system that transmits signals between the vehicle hardware 28 and communication network 16. According to an exemplary embodiment, wireless carrier system 14 includes one or more cell towers 70, base stations and/or mobile switching centers (MSCs) 72, as well as any other networking components required to connect the wireless system 14 with communication network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within the MSC or some other network component as well.

Communication network 16 connects wireless carrier network 14, call center 20, navigation-related website 18, as well as other systems and networks. Communication network 16 may be a conventional land-based telecommunications network that is connected to one or more landline telephones. For example, communication network 16 can include a public switched telephone network (PSTN) and/or an Internet Protocol (IP) network, as is appreciated by those skilled in the art. Of course, one or more segments of communication network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 20 need not be connected via communication network 16, but could include wireless telephony equipment so that it can communicate directly with wireless network 14.

Call center 20 generally provides vehicle hardware 28 with a number of different system back-end functions. According to the exemplary embodiment shown here, call center 20 generally includes one or more switches 80, servers 82, databases 84, live advisors 86, as well as a variety of other telecommunication and computer equipment 88 that is known to those skilled in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store road data, subscriber profile records, subscriber behavioral patterns, or any other pertinent subscriber information. Although the illustrated embodiment has been described as it would be used in conjunction with a manned call center 20, it will be appreciated that the call center can utilize an unmanned automated call response system and, in general, may be any central or remote facility, manned or unmanned, mobile or fixed, to or from which it is desirable to exchange voice and data transmissions.

Navigation-related website 18 is connected through communications network 16, and can preferably provide users with navigational routes and/or other navigation-related services. For example, a user can interact with the website via some type of graphical user interface and provide it with such information as a starting point, a destination, and route restrictions or enhancements (such as avoiding certain highways, or taking certain short cuts, etc.), to name but a few of the possible inputs. The website will then use route generating algorithms and road data to develop and provide a navigational route to the user through various means. For instance, the route may be displayed on a computer screen, printed, sent to an e-mail address, or transferred to a personal digital assistant. Navigation-related website 18 can be especially helpful by allowing a user to study the route and the surrounding area before actually traveling. This gives the user time to digest the information provided in order to feel more comfortable while traveling along the route, which is oftentimes in an unfamiliar area. Although described as a website, one skilled in the art will recognize that other systems, entities and methods of requesting and receiving a vehicle navigation route could also be used. For example, a user may also request navigational routes through a cell phone, a personal digital assistant, a computing kiosk, or some other entity having a route generator.

Figure 2:
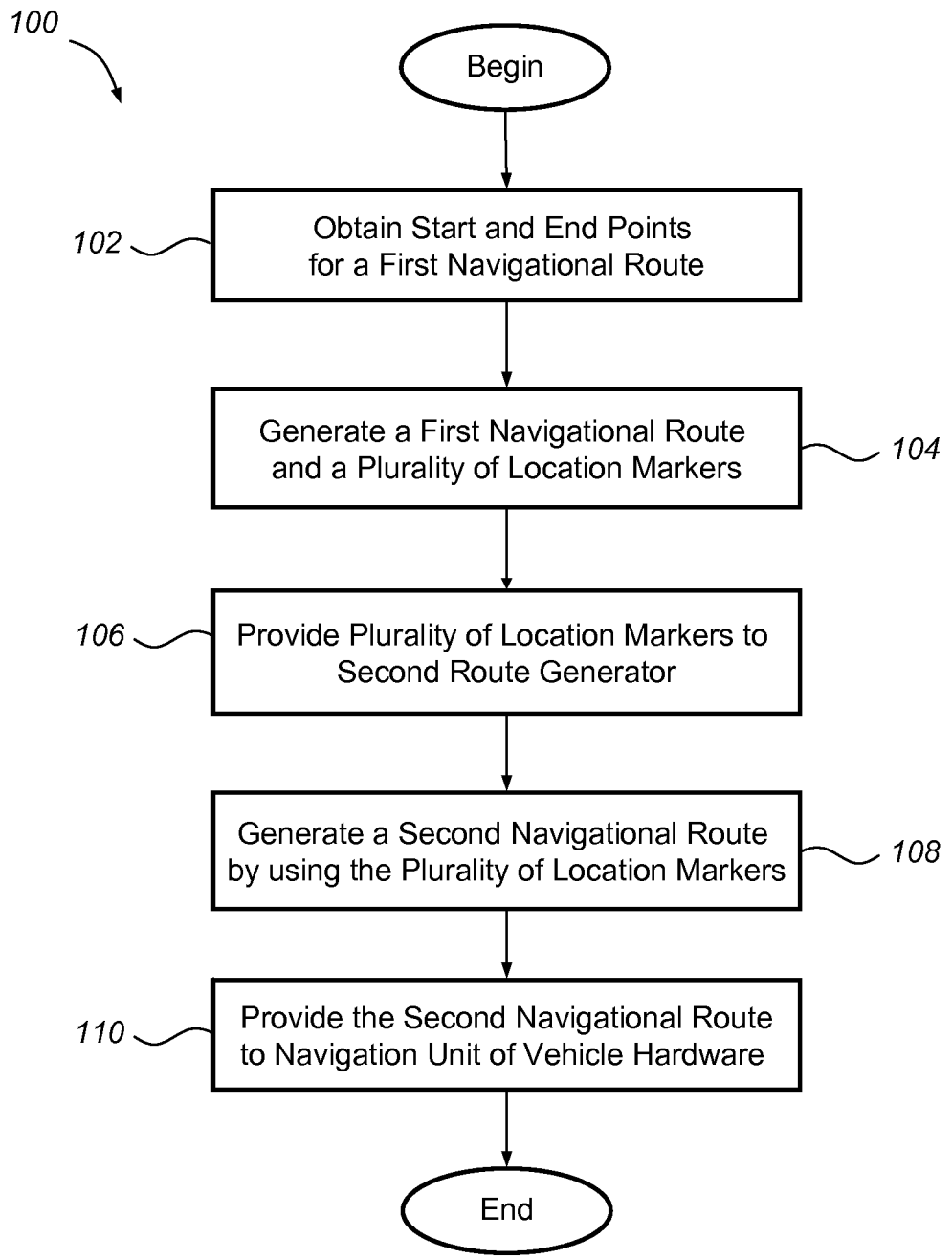
FIG. 2 is a flowchart showing some of the steps of an embodiment of the route-matching method.

Turning now to FIG. 2, there is shown an embodiment of a route-matching method 100 that synchronizes first and second navigational routes, even when they are created by route generators that are made by different manufactures and use different route generating algorithms and/or road data. By synchronizing the navigational routes, route-matching method 100 enables a user to initially preview a first navigational route via a website or other service, before utilizing a second, similar navigational route when driving. Route-matching or route-synchronization can reduce the likelihood of driver confusion or frustration that can result when the two navigational routes extending between the same start and end points differ from one another. Route-matching method 100 is preferably implemented in the form of software or firmware instructions, which may reside in electronic memory devices located in the vehicle hardware 28, the navigation-related website 18, the call center 20, and/or an intermediary system, to name but a few possibilities.

According to this particular embodiment, route-matching method 100 begins by obtaining start and end points for a first navigational route, step 102. One way of obtaining this information is through the use of a web-based user interface on a navigation-related website. For example, a user can visit website 18 and engage a web-based user interface to enter a home address or the vehicle's current location (start point) and a destination such as a local airport (end point). The route generator used by website 18 then generates a first navigational route, step 104, potentially taking into account various features such as the avoidance of certain highways, the use of scenic routes, or the inclusion of one or more intermediary destinations, such as the residence of a person that is to be picked up on the way to their destination, for example. According to another embodiment, the user can input a single start point and multiple end points and request that the route generator devise a single navigational route that efficiently stops at each of the requested destinations. It should be recognized, the aforementioned features are only examples of some of the numerous types of features that can be available with route generators, as numerous other features known to those skilled in the art could also be used.

The first navigational route preferably includes a plurality of location markers that represent geographic points along the route, such as maneuver points, turns, intersections, start points, end points, points-of-interest, etc. Depending on the length and nature of the navigational route, the first route generator creates a number of location markers representing maneuver points along the route, each of which is provided with coordinate information. For example, if a navigational route passes through eight intersections between the start and end points, then a total of ten or less location markers each having coordinate information could be provided (two markers for the start and end points, and eight markers for maneuver points associated with each of the intersections). According to another example, the route generator may only provide a total of eight or less location markers for the same navigational route (two markers for the start and end points, and six markers only for those intersections that require the vehicle to turn). Of course, location markers can be used to identify numerous other maneuver points along the route, not just intersections and turns, and the exact number of location markers can be more or less than those of the examples provided above. Other maneuver points can be, for example, highway exits/entrances, intermediate stops, points of interest, mile markers, etc. The coordinate information may consist of GPS data, latitude and longitude data, as well as any other coordinate information that is representative of a geographic location. Generally, the location markers are formatted to be machine readable, although they could be made available in a user-friendly or human readable format as well.

It should be appreciated that during step 104, the location markers and navigational route can be created according to one of a number of different techniques using various sequences of steps. For example, some route generators use algorithms that generate the location markers from the navigational route; that is, the route is devised first and then, at some subsequent time, the location markers are determined from the navigational route. Other route generators may instead generate the navigational route from the location markers; in this scenario, the location markers are first identified so that the navigational route can be built using those markers. According to yet other embodiments, the navigational route and location markers are generated concurrently. It should be appreciated that the methods of matching or synchronizing routes disclosed herein can be used with any one of these route/location marker generating sequences, as well as any other appropriate sequence not mentioned here but known in the art.

In step 106, navigation-related website 18 provides the various location markers and their corresponding coordinate information to a second route generator, which in this example is part of a telematics-based vehicle navigation system. By providing the second route generator with location markers taken from the first navigational route, the second route generator is able to devise a navigational route that corresponds to the first route. Stated differently, because the location markers from the first navigational route are provided as input to the second route generator, it is likely that the two routes will be 'similar' to one another, although not necessarily identical. Being similar could involve the two routes being identical, but will at least involve the two routes sharing at least some common route segments or portions, even though the algorithms and road data used may be different. The location markers can be transmitted between the systems in any number of ways, including through communication network 16, over wireless carrier system 14, or though any other means, wired or wireless, known in the art.

Once the second route generator receives the location markers, it generates a second navigational route, step 108, that is similar to the one previously reviewed by the user. If a telematics-based or off-board vehicle navigation system is used, then the second route generator is preferably housed at a system back-end facility, such as call center 20, although it could be maintained at any appropriate location within system 10. In the event that an autonomous or on-board vehicle navigation system is used, then the second route generator is preferably located within the vehicle hardware 28. The second route generator creates the second navigational route by utilizing stored road data in conjunction with the location markers supplied in step 106 in order to connect the location markers and, in a sense, re-create the first navigational route. Road data not only includes detailed maps of the area(s) in question, but can also include information such as average travel speeds, one-way streets, highway exit/entrance ramps, travel impediments, such as construction sites or traffic congestion, etc. And because the road data is maintained and provided by call center 20, it can be easily and frequently updated.

At this point, the second navigational route is supplied to the navigation unit 32 of the vehicle hardware and, in turn, conveyed to a user in a traditional manner, step 110. For example, vehicle navigation system can provide spoken turn-by-turn directions through audible speech, or can provide direction instructions using a visual display, such as a heads-up display or a video screen. Since the second navigational route is similar to the first route, the user will feel more comfortable while traveling as they are following a course that is similar to the one that they previously reviewed.

Alternatively, some steps of the route-matching method 100 could be carried out by an intermediate system between the first and second route generators. For example, the first navigational route generated in step 104 could alternatively be sent to an intermediate system for generating the location markers. At which point, the intermediate system could then provide the location markers to the second route generator for processing.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A route-matching method for use with a vehicle navigation system, comprising the steps of:
    (a) utilizing a first route generator to generate a first navigational route having a plurality of location markers, wherein coordinate information is provided for each of said location markers;
    (b) providing said plurality of location markers to a second route generator; and
    (c) utilizing said second route generator and said plurality of location markers to generate a second navigational route, wherein said second route generator attempts to recreate said first navigational route by utilizing said plurality of location markers in the generation of said second navigational route.

2. The method of claim 1, wherein said method further comprises the step of obtaining a start point and an end point through a web-based user interface.

3. The method of claim 2, wherein said web-based user interface interacts with said first route generator to generate said first navigational route.

4. The method of claim 1, wherein said plurality of location markers includes a start point, an end point, and a plurality of maneuver points along said first navigational route.

5. The method of claim 4, wherein said coordinate information includes longitude and latitude coordinates for each of said location markers.

6. The method of claim 5, wherein said longitude and latitude coordinates are provided as GPS coordinates.

7. The method of claim 1, wherein said second route generator is part of a telematics-based vehicle navigation system and is located at a call center.

8. The method of claim 1, wherein said second route generator is part of an autonomous vehicle navigation system and is located within vehicle hardware.

9. The method of claim 1, wherein said first and second navigational routes are substantially similar.

10. A system for coordinating navigational routes, comprising:
    a website having a first route generator for generating a first navigational route, the first navigational route includes a plurality of location markers;
    a call center having a second route generator for generating a second navigational route, the second route generator receives the plurality of location markers from the first route generator and uses the location markers to recreate the first navigational route without any further input from a user; and a navigation unit located on a vehicle, wherein the call center wirelessly sends the second navigational route to the navigation unit.

\* \* \* \* \*